United States Patent
Lefaure

(10) Patent No.: US 6,998,973 B2
(45) Date of Patent: Feb. 14, 2006

(54) DATA TRANSMISSION METHOD FOR A TIRE-PRESSURE MONITORING SYSTEM OF A VEHICLE

(75) Inventor: Philippe Lefaure, Montbrun Lauragais (FR)

(73) Assignee: Siemens VDO Automotive, Toulouse Cedex (FR)

( * ) Notice: Subject to any disclaimer, the term of this patent is extended or adjusted under 35 U.S.C. 154(b) by 149 days.

(21) Appl. No.: 10/771,374

(22) Filed: Feb. 5, 2004

(65) Prior Publication Data

US 2004/0155762 A1    Aug. 12, 2004

(30) Foreign Application Priority Data

Feb. 6, 2003 (FR) .................................. 03 01386

(51) Int. Cl.
*B60C 23/00*    (2006.01)

(52) U.S. Cl. ....................... 340/442; 340/438; 73/146.2

(58) Field of Classification Search ................ 340/442, 340/438, 443, 445, 446, 447, 448; 73/146.2, 73/146.3, 146.8
See application file for complete search history.

(56) References Cited

U.S. PATENT DOCUMENTS

| 5,838,229 A | 11/1998 | Robinson | |
| 6,331,822 B1 * | 12/2001 | Sato et al. ................. | 340/3.22 |
| 6,505,507 B1 * | 1/2003 | Imao et al. ................ | 73/146.5 |
| 6,700,480 B1 * | 3/2004 | Moore ........................ | 340/445 |
| 6,885,293 B1 * | 4/2005 | Okumura .................... | 340/448 |

FOREIGN PATENT DOCUMENTS

WO    WO 96 15919    5/1996

* cited by examiner

*Primary Examiner*—Daryl C Pope
(74) *Attorney, Agent, or Firm*—Young & Thompson

(57) ABSTRACT

A data transmission method for a tire-pressure monitoring system (10) of a vehicle. The data is transmitted by wheel units (12) to a central computer (13) located in the vehicle. The method comprises:

a data transmission phase in parking mode, over a first period; and a data transmission phase in running mode, over a second period shorter than the first period. The method is characterized in that a natural time lag between various internal clocks with which each wheel unit (12) is equipped is used to prevent collisions between transmissions from the various wheel units of one and the same vehicle.

12 Claims, 1 Drawing Sheet

DATA TRANSMISSION METHOD FOR A TIRE-PRESSURE MONITORING SYSTEM OF A VEHICLE

FIELD OF THE INVENTION

The present invention relates to a data transmission method for a tire-pressure monitoring system of a vehicle. More particularly, it relates to a method for preventing collisions between the data transmitted by the wheel units of one and the same vehicle.

BACKGROUND OF THE INVENTION

It is known to equip motor vehicles with tire-pressure monitoring systems. These systems generally comprise a device fixed to the inside of the tire and called a wheel unit. This wheel unit measures the pressure inside the tire (and also a certain number of other parameters such as, for example, the temperature) and transmits the measurements made to a central computer located in the vehicle. This central computer is responsible for warning the driver of any pressure defect in one of the tires. Of course, each wheel unit is provided with an identifier so that the data received by the central computer not only contains the measurements made but also an indication of position of tire (right or left front tire, right or left rear tire) in which these measurements have been made.

It is also known to transmit the data, measured by the suitable sensors located in the wheel units, at different time intervals depending on the movement of the vehicle. If the vehicle is in parking mode, that is to say at rest or moving at very slow speed (for example less than 25 km/h), the measurements made by the wheel units are generally transmitted at relatively long time intervals (of around one hour). On the other hand, when the vehicle is in running mode, that is to say moving at more than 25 km/h, the same information is transmitted to the central processing unit at time intervals of around one minute.

As soon as the vehicle is in running mode, each wheel unit regularly transmits the measurements made. However, many transmission are thus made simultaneously by several wheel units of one and the same vehicle. This results in scrambling of the messages received by the central processing unit that collects the transmissions coming, sometimes simultaneously, from the four wheels (or even more in the case of heavy goods vehicles). In this case, the data measured can no longer be used and the system becomes inoperable.

To overcome these drawbacks, it is known to time-shift the transmission of each wheel unit. These time-shifting methods are complex as they require all the wheel units of one and the same vehicle to be synchronized. Furthermore, this requires complex computations that limit the time intervals available for transmission.

To overcome this problem of collision between data transmitted by each wheel unit, it is also possible to ensure that the central computer interrogates each of the wheel units one by one. However, here again, this operating mode extends the time required to receive all the data and slows down the performance of the tire-pressure monitoring system.

SUMMARY OF THE INVENTION

The object of the present invention is to implement a method of transmitting data between a wheel unit and a central computer that avoids collisions between the transmitted data, while remaining simple, inexpensive and fast.

For this purpose, the present invention relates to a data transmission method for a tire-pressure monitoring system of a vehicle, said data being transmitted by wheel units to a central computer located in the vehicle, said method comprising:
 a data transmission phase in parking mode, over a first period; and
 a data transmission phase in running mode, over a second period shorter than the first period; said method being characterized in that:
 a natural time lag between various internal clocks with which each wheel unit is equipped is used to prevent collisions between transmissions from the various wheel units of one and the same vehicle.

By virtue of this natural time lag, it is possible to prevent collisions between transmitted data without employing means that are complex, time-consuming and expensive.

More precisely, the relatively poor precision of the circuits producing the internal clock of the wheel unit is put to good use in order to automatically time-shift (randomly) the transmissions from the wheel units.

Again advantageously, the internal clocks of the wheel unit are produced by RC-type oscillating circuits. The precision of such oscillators is preferably about ±15%.

Thus, unlike what is usually produced in the wheel unit, in which it is general practice to seek to have extremely precise internal clocks so as to be able to operate a defined time shift between the transmission of the data and thus prevent collisions, the present invention uses, on the contrary, internal clocks of poor precision, and therefore there are less expensive and less difficult to implement in order to obtain a similar result.

BRIEF DESCRIPTION OF THE DRAWINGS

Other objects, features and advantages of the present invention will also become apparent from the description that follows, given by way of non-limiting example and with reference to the appended drawings in which.

DETAILED DESCRIPTION OF THE INVENTION

Figure 1:
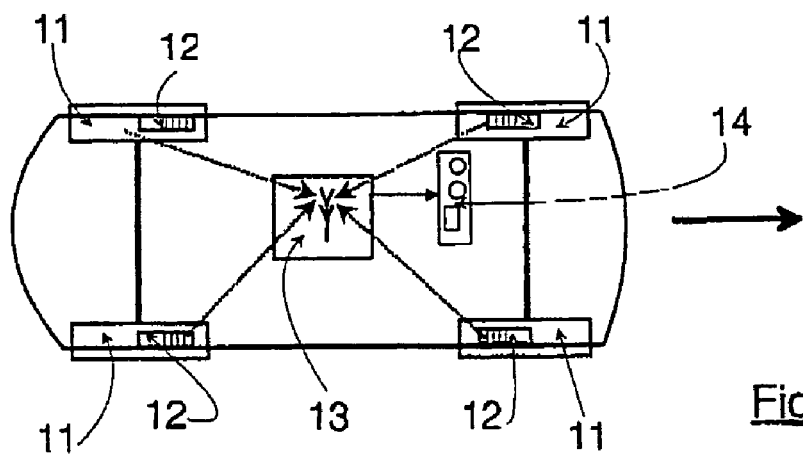
FIG. 1 is a schematic view of a vehicle fitted with a device according to the invention.

According to the embodiment shown in FIG. 1, the tire-pressure monitoring system 10 according to the invention comprises two main elements, namely:
 a plurality of wheel units 12 mounted in each of the wheels 11 of the vehicle; and
 a central computer 13 that receives the data transmitted by the wheel units. This central computer is placed in the vehicle.

Indicated below is a very brief reminder of how a tire-pressure monitoring system operates.

The wheel units 12, placed in each of the wheels, are positioned on the rim inside the wheel. These wheel units are provided with suitable sensors, especially with a pressure sensor, but also with sensors for measuring temperature, acceleration, speed, etc. Each wheel unit has an identifier that is specific to it. It regularly transmits data (including the values of the measurements made, but also its identifier) to the central computer that receives and processes the data. Sometimes, this data has already been preprocessed in the wheel unit itself. After processing, the central computer determines whether it is necessary to inform the driver of a defect and, in order to do so, uses the display devices 14 located on the instrument panel of the vehicle.

Figure 2:
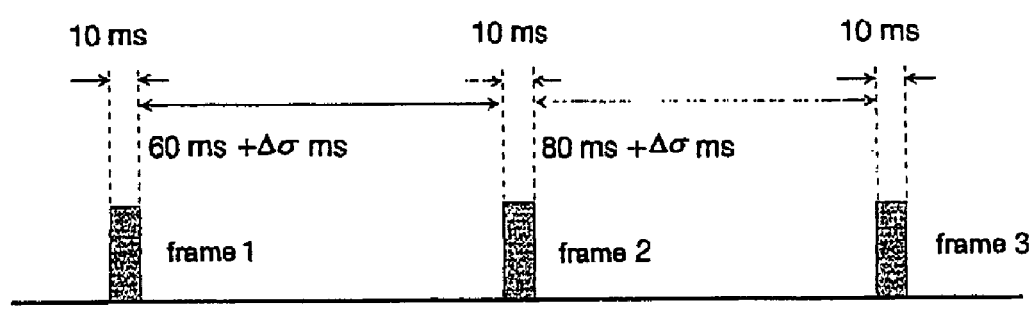
FIG. 2 is a schematic view showing an example of frame transmission in running mode.

It should be noted (see. FIG. 2) that the messages transmitted by the wheel units preferably consist of three frames having identical data. These frames are each transmitted for 10 ms. The time interval separating the first and second frames is ±60 ms+$\Delta\sigma$ ms. The time interval separating the second and third frames is ±80 ms+$\Delta\sigma$ ms. $\Delta\sigma$ is a value due to the imprecision of each clock. The value of $\sigma$ is 0.25 ms (as will be explained later with regard to FIG. 3). The entire message (with these three frames) is transmitted every minute when the vehicle is moving (for example with a speed greater than 25 km/h). It should also be noted that the entire message is transmitted during one revolution of the vehicle's wheel, so as to avoid transmission symmetry problems.

Each wheel unit consists in particular of a microcontroller whose internal clock consists, according to the present invention, of an RC oscillator (a conventional device comprising resistors and capacitors) and of an RF transmitter.

According to the present invention, it is preferred to use RC oscillators whose precision is about ±15%.

Thus, when the microcontroller of the wheel units detects that the vehicle is in running mode, it starts to transmit data, especially pressure data, every minute. Now, the microcontroller call-up and the transmission sequence are managed by means of the internal clock with a precision of about ±15%. This has the consequence of randomly time-shifting the transmissions of the first frames of a message, but also of the following two frames.

Figure 3:
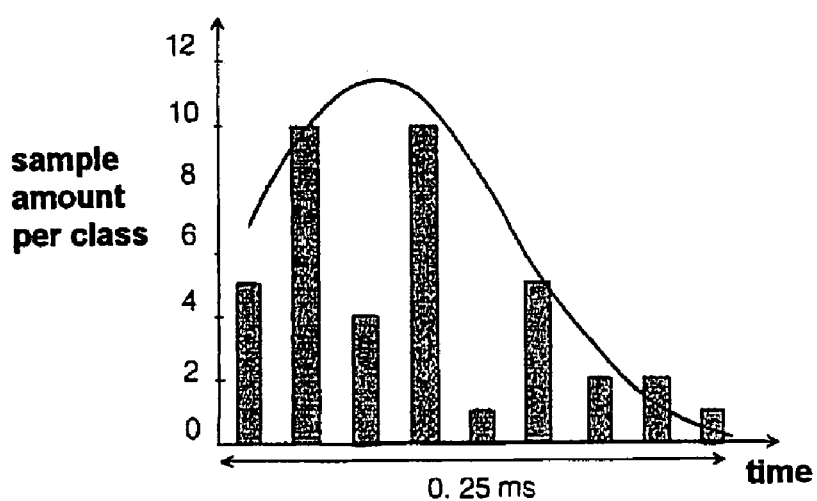
FIG. 3 is a diagram showing the range in inter-frame time owing to the natural internal time lag of the device used.

As FIG. 3 shows, the tolerance of the oscillator follows a Gaussian-type distribution law with a standard deviation of around 25 ms.

Thus, the transmission sequence of the various messages coming from the various wheels makes it possible to avoid (or minimize) the risk of a collision between the transmitted data, by randomly time-shifting each frame transmission from a wheel unit relative to the other wheel units.

The use of the substantial tolerance possessed by each internal microcontroller clock mounted in each wheel unit thus makes it possible to minimize the risk of simultaneously transmitting several information items, without the use of complex and/or expensive devices.

It should be noted that the natural time lag $\Delta\sigma$ also applies to the time interval of one minute (in running mode) and of one hour (in parking mode) between each data transmission.

Of course, the present invention is not limited to the method of implementation indicated above, rather it encompasses any variant lying within the competence of a person skilled in the art. Thus, the degree of precision may be different from ±15%, provided that this automatically introduces a time lag in the transmissions, thus avoiding any risk of a collision. Likewise, the operating mode of the vehicle (parking or running) may be determined by a speed of movement other than 25 km/h. In particular, the running mode may be detected as soon as the ignition has been turned on or the engine started, or even as soon as a request for gaining access to the inside of the vehicle is indicated.

What is claimed is:

1. A data transmission method for a tire-pressure monitoring system (10) of a vehicle, said data being transmitted by wheel units (12) to a central computer (13) located in the vehicle, said method comprising:
   a data transmission phase in parking mode, over a first period; and
   a data transmission phase in running mode, over a second period shorter than the first period; said method being characterized in that:
   a natural time lag between various internal clocks with which each wheel unit (12) is equipped is used to prevent collisions between transmissions from the various wheel units of one and the same vehicle.

2. The method as claimed in claim 1, characterized in that the internal time lag between the various clocks of each wheel unit is preferably determined by the precision of an RC-type oscillator mounted in each wheel unit.

3. The method as claimed in claim 2, characterized in that RC oscillators having a precision of about ±15% are preferably used.

4. The method as claimed in claim 1, characterized in that each wheel unit transmits several frames for each data item to be transmitted.

5. The method as claimed in claim 4, characterized in that three frames are transmitted for each data item to be transmitted.

6. The method as claimed in claim 5, characterized in that the time interval separating the first and second frames is around 60 ms+$\Delta\sigma$ ms and the time interval separating the second and third frames is around 80 ms+$\Delta\sigma$ ms.

7. The method as claimed in claim 4, characterized in that the frames transmitting the same data item are transmitted during a single wheel revolution.

8. A tire-pressure monitoring system (10) of a vehicle, employing the method as claimed in claim 1, said system being characterized in that it includes, for each wheel unit (12), an internal clock produced by an RC type circuit whose precision is about ±15%.

9. The method as claimed in claim 2, characterized in that each wheel unit transmits several frames for each data item to be transmitted.

10. The method as claimed in claim 3, characterized in that each wheel unit transmits several frames for each data item to be transmitted.

11. The method as claimed in claim 5, characterized in that the frames transmitting the same data item are transmitted during a single wheel revolution.

12. The method as claimed in claim 6, characterized in that the frames transmitting the same data item are transmitted during a single wheel revolution.

* * * * *